INVENTORS
PAUL F. DEISLER JR. &
RICHARD H. WILHELM

BY Harold T. Stowell

ATTORNEY

April 3, 1956   P. F. DEISLER, JR., ET AL   2,740,894
RAPID GAS ANALYSER

Filed Oct. 21, 1952   3 Sheets-Sheet 2

INVENTORS
PAUL F. DEISLER JR. &
RICHARD H. WILHELM
BY Harold T. Stowell
ATTORNEY April 3, 1956  P. F. DEISLER, JR., ET AL  2,740,894
RAPID GAS ANALYSER
Filed Oct. 21, 1952  3 Sheets-Sheet 3

INVENTORS
PAUL F. DEISLER JR. &
RICHARD H. WILHELM
BY Harold T. Stowell
ATTORNEY

United States Patent Office

2,740,894
Patented Apr. 3, 1956

2,740,894

RAPID GAS ANALYSER

Paul F. Deisler, Jr., Berkeley, Calif., and Richard H. Wilhelm, Princeton, N. J., assignors to Research Corporation, New York, N. Y., a corporation of New York Application October 21, 1952, Serial No. 316,036

9 Claims. (Cl. 250—43.5)

This invention relates to the analysis of gas mixtures, and particularly binary gas mixtures, and has for its primary object the provision of an improved instrument for this purpose, utilizing the selective ionization produced by alpha-ray particles at a definite distance within the "range" of the alpha particles in the gas mixture being tested.

It has been known to use radioactive materials to ionize gases and also to ionize gas by bombardment with slow speed electrons as from a filament. However, all such methods so far as we are aware, are either used to detect the presence of a gas, as in a fire-alarm system, or else seek to analyze gas mixtures as a function of the total amount of ionization produced. Since the total amount of ionization produced varies very little between different gases, the accuracy of this method is inherently limited. It is an object of our invention to provide an accurate method of gas analysis by taking advantage of a special characteristic of alpha particle ionization, which will be explained more fully below.

It is another object of the invention to provide a means of gas analysis having a very high speed of response, in the order of between 0.003 and 0.1 second. This high speed of response renders possible the detailed and extremely rapid analysis and detection of gas changes in a mixture being tested.

The principle of operation of the invention is dependent on the fact that the rate of production of ions in a gas by ionizing radiations in general, and alpha particles in particular, is a function of the nature of the gas. The conductivity of a gas exposed to such radiation is thus a function of composition, and measurement of the conductivity gives a measurement of the composition if performed under proper conditions.

A particular advantage of the invention is that it is inexpensive to construct and operate, provides directly a relatively high electrical output which may be readily measured and recorded, and is adaptable to many purposes.

A further advantage of the invention is that it can readily be embodied in an instrument capable of insertion directly into the gases under study, and that it interferes very little with the flow of these gases.

The specific nature of the invention, as well as other objects and advantages thereof, will clearly appear from a description of a preferred embodiment as shown in the accompanying drawings in which.

If an alpha particle source is placed in a closed gas filled chamber, the number of ions produced per unit of time in the chamber will, in general, depend on the nature of the gas, for a particular source. These ions will render the gas conductive so that if a pair of electrodes is placed in the chamber, and a voltage is applied to it, a current will flow across the conductive gas and through the circuits external to the chamber. For a binary mixture of gases at constant temperature and pressure, the rate of production of ions by the alpha particles will be a function of the gas composition only. If the voltage impressed on the electrodes is maintained constant, then the current produced will be a function of gas composition only, and measurement and recording of this current makes possible the measurement and recording of the gas composition, providing that the device is first calibrated with known gas mixtures.

Such a chamber as above described is a well known device used for the detection of ionizing radiation. It is generally called an "ionization chamber," the Geiger-Mueller tube being an outstanding example. The main difference between the usual ionization chamber and the gas analyzer chamber described below is that in the latter case the radiation source is not unknown as in the former but is known or fixed, and it is the composition of the gas that is unknown; also the voltage range is not that usually employed in the Geiger-Mueller circuit. The gas analyzer chamber will, however, have many operating characteristics in common with the usual ionization chamber.

Figures 1, 2:
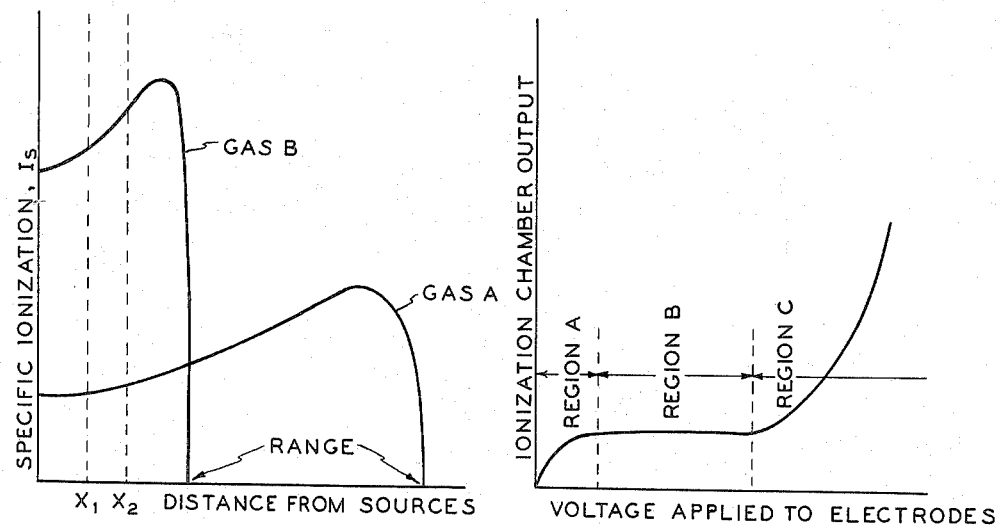
Fig. 1 is a graph showing two specific ionization curves used in explaining the basis of the invention.
Fig. 2 is a graph showing the characteristic curve of the ionization chamber in order to explain the voltage rate employed.

Alpha particles cause ionization in gases by a variety of mechanisms. High energies and strong positive fields of these particles cause both internal electronic rearrangements in atoms and complete ionization of atoms by removal of electrons from them. Molecules may be ionized both by the loss of electrons and the loss of whole charged radicals. Whatever the mechanism, for every positive charge created there is also created a negative charge, and such pairs of charges are called "ion-pairs." The number of ion-pairs which a particle produces in a gas will depend on the energy of the particle, and as a given particle loses energy in traversing a gas, the particle's ionizing power will be a function of the distance it has travelled in the gas as well as its initial energy. The ionizing power of an alpha particle at a particular distance from its source is often expressed in terms of the specific ionization it produces at that point. Specific ionization is the number of ion-pairs produced per unit of path traversed by an alpha particle. Two characteristic curves of specific ionization as a function of distance traversed from the source are shown in Fig. 1. The point at which the specific ionization becomes zero is the "range" of the alpha particle. The two curves of Fig. 1 represent typical characteristics of alpha particles from a given source in two different gases. The ranges of alpha particles from the same source are generally very different with different gases. Ranges are usually given in terms of relative stopping power, S, which is the ratio of the range in air to that of the gas of interest at the same conditions.

The area under a specific ionization curve is the total number of ion-pairs produced by an alpha particle. This total ionization is frequently expressed as "total relative ionization," the ratio of the total ionization in the gas in question to that in air at S. T. P. Total relative ionization does not change much from gas to gas, being approximately 1.0 for gases such as $H_2$, $N_2$, $O_2$, $NH_3$, and $CO_2$. A high relative total ionization is exemplified by that of n-pentane, which is 1.35. An analytical chamber designed to measure total ionization would, therefore, not be capable of distinguishing very clearly between many of the common gases. Furthermore, the analytical cell would have to be at least as large as the maximum range encountered in use with any gas mixture. An analytical cell would therefore have to be several centimeters in diameter, and holdup in it would be so large for many applications that rapid changes in concentration would be averaged out. Such a cell would not give satisfactory performance.

The analytical cell actually used is so constructed that its important dimensions are smaller than the minimum range of the alpha particles for all the gas mixtures of interest. This principle of design can be best understood by referring to Fig. 1 again. If the electrodes are placed at $x_1$ and $x_2$ in such a manner that only those ions formed between them are collected, then the ionization current produced when pure gas B is in the cell is considerably greater than when pure gas A is in the cell, as can be seen by comparing the areas under curves A and B, between $x_1$ and $x_2$.

As mentioned above, total ionization is fairly constant from gas to gas, while the range of the alpha particles varies widely from gas to gas. Alpha particles from polonium have a range in $N_2$ of about 3.6 cm., and in hydrogen of about 16.0 cm., for example, although their total relative ionizations are about equal. This means that specific ionizations will vary inversely as the range, as a rough approximation. Two gases such as A and B of Fig. 1 would show relatively little difference if total ionization were measured, but considerable difference if only the ionization between $x_1$ and $x_2$ were measured. It is this latter design which is used in this case.

For a constant gas composition, the ionization current produced will be a function both of the rate of production of ions and of the voltage applied to the electrodes. A typical curve of cell output or ionization current against applied voltage is shown in Fig. 2. Three regions are readily distinguished. Region A represents that region in which the applied voltage is so low that the ions move slowly enough to permit considerable recombination before they are collected on the electrodes. As the applied voltage is increased, the speed of the ions increases, and more reach the electrodes before recombining. Thus in this region cell output current increases with increasing voltage.

Region B represents a range of voltage over which virtually all of the ions produced reach the electrodes, that is, a saturation range. In this region the output current is almost constant, regardless of the applied voltage.

In region C, the applied voltage accelerates the ions to the point where the ions themselves have sufficient energy to produce additional ions, so that the output current increases rapidly with increasing applied voltage. This principle is employed in the Geiger-Mueller counter.

Region B, the saturation region, is the region in which it is most desirable to operate an analytical cell, for no great precautions need be taken to regulate the applied voltage, yet practically all of the ions produced are collected. The shape of the output curve will vary as the nature of the gas in the cell is varied, and also as the size and configuration of the cell and electrodes are varied. For a given cell, it is necessary to locate region B for each pure component in the mixture to be used, and then to apply a voltage within this region, for the best operation of the cell.

Alpha particles have several outstanding advantages as the ionizing medium. Alpha particles present little or no safety problem by themselves. If the simple precaution of never coming into actual physical contact of any sort with an alpha emitter is observed, then little danger of harm will be encountered. Their very short ranges in air, amounting to only a few centimeters, as well as the fact that a piece of ordinary letter paper will stop them completely, makes the shielding problems simple. The wall thickness of the apparatus in which alpha particles are used generally is sufficiently large to provide complete shielding.

Another major advantage of alpha particles over other types of radiations is that with their combination of a short range, a high field, and high energies, large output currents are obtained. The problem of measuring the output is thus greatly simplified. With the present apparatus, output ionization currents of the order of $10^{-8}$ amperes are obtained, which is quite a large current compared to those generally encountered in radiation studies.

The safety considerations mentioned above are only applicable to alpha particle sources producing no other radiations than alpha particles and producing no gaseous radioactive products. Radium itself would be an extremely undesirable alpha-emitter to use, for not only does it produce both beta and gamma rays of dangerous energy, but radon, a radioactive gas, is the decay product of radium.

The desirable features of an alpha emitter are, then, that it emit only alpha particles or that other radiations be of very low intensity; that it have not too short a half-life in order to avoid the necessity of frequent recalibration of the analytical cell; that it be a non-volatile solid, yielding only non-volatile solids as decay products; and that the specific rate of alpha particle emission be high. This last requirement follows from the fact that the per cent standard deviation of the total emission rate is inversely proportional to the square root of the total emission rate. As a high standard deviation due to a low total emission rate could cause a correspondingly high variance in the output current, precision of the analytical cell would be considerably impaired by too low a rate. Furthermore, it is the specific emission rate, or rate per unit mass, which must be high in order not to have to use too bulky an alpha particle source to achieve a high total emission rate.

Only one source, radium D, has been found combining all of the desirable characteristics. While radium D is not an alpha-emitter, its decay leads to the production of polonium by the following process:

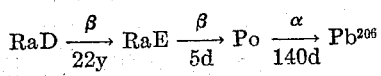

$$\text{RaD} \xrightarrow[22y]{\beta} \text{RaE} \xrightarrow[5d]{\beta} \text{Po} \xrightarrow[140d]{\alpha} \text{Pb}^{206}$$

The polonium is the alpha-emitter. Its half-life is only 140 days, so that its use, by itself, would necessitate too frequent recalibration. Radium D has a half-life of 22 years, and thus provides an almost constant source of polonium. The alpha particle emission rate of such a source would decrease only about 1.0 per cent in four months.

The RaD and RaE decays are accompanied by the emission of beta rays so weak that half a millimeter of brass is more than enough shielding. The analytical cell and the container in which it is located will serve as shielding in this case. All of the substances above are non-volatile solids, the final product being stable lead.

Since RaD does not melt until it attains a temperature of 327.5° C., it can be freely used at all lower temperatures. In the event that operation at higher temperatures is desired, a salt of RaD may be used, a particular salt being selected which has an adequately high melting point and chemical stability for the intended use.

One general consideration remaining in connection with the use of ionizing radiations in general and alpha particles in particular is the possibility of chemical effects on the systems being analyzed. Such effects do exist, and the literature shows that a number of reactions have actually been observed. Hydrocarbons tend both to break down and build up their molecular weight when subjected to alpha particles and, in fact, almost any reactive system undergoes change. The efficiencies are low, however, and the reaction rates are negligible for most purposes. While hydrogen and oxygen react very rapidly in a eudiometer in which the reaction is initiated by an electric spark, mixtures of about 13 cc. in volume of the gases, acted on by 0.13 millicurie, take from seven to nineteen days for complete reactions. The only effect that slow reactions of this sort might have is the slow fouling of the RaD surface with the liquid or solid higher hydrocarbons. No such effect was noted while using $C_2H_4$ and $C_2H_6$, although prolonged use of the gas analyzer might make it apparent.

A suitable source of RaD is obtainable from the Canadian Radium and Uranium Corporation, 630 Fifth Avenue, New York, in the form of a specimen of RaD mixed with silver and rolled into a silver strip by a process known to the supplier, which permits the use of aged RaD, already containing a steady state fraction of polonium, and therefore ready for immediate use. The pure RaD could probably be obtained by electroplating, but not only is this difficult but also it would be necessary to wait for more than two years for a usable quantity of polonium to build up in the source after electrodeposition.

Figure 3:
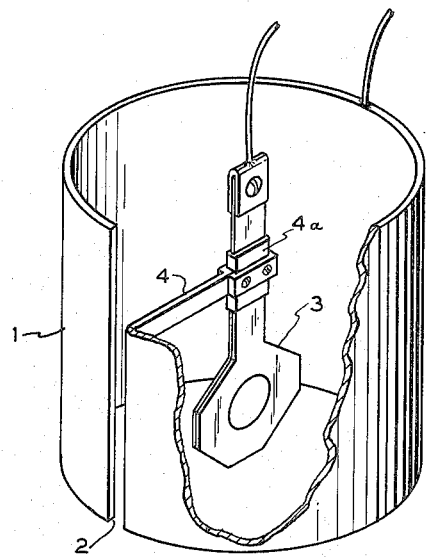
Fig. 3 is a perspective view showing the basic element of the gas analyzer.

The analyzer chamber 1 (Fig. 3) is a cylinder, for example, of drawn brass. It is not completely closed as indicated at 2 so that it can be forced into a tube of slightly smaller diameter. The reason for this construction is that the chamber is designed to be inserted into a packed tube as will be shown in connection with Fig. 4. The two silver strips 3 containing the radioactive material are clamped to the arm 4 in the center of the chamber in such a way that the alpha-emitting sources are exposed to the gases in the chamber when in operation. Two strips are used in order to irradiate the gas in both halves of the chamber. The two strips are wrapped in a suitable insulating tape 4a, which may be Teflon, before mounting, in order to insulate the strips electrically from the supporting arm 4 and the chamber 1.

Figure 4:
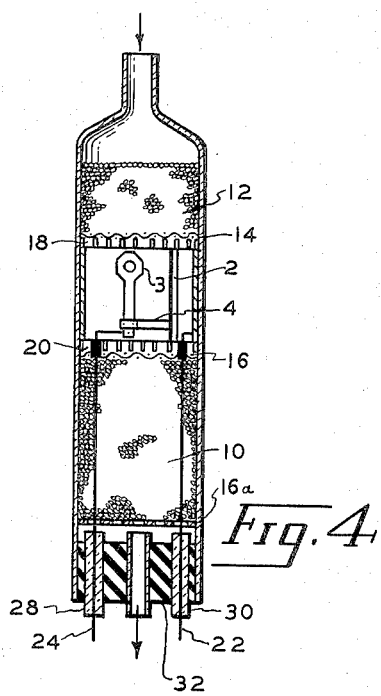
Fig. 4 is a cross sectional elevation of a gas analyzer unit including the element of Fig. 3.

Referring now to Fig. 4, the ionization chamber is shown mounted in a gas testing unit comprising in addition to the analyzer, packing chambers 10 and 12 above and below the analyzer chamber, these packing chambers containing suitable packing, for example, glass balls or beads of about three millimeter diameter. These beads are retained in place by suitable screens 14 and 16, for example, circular pieces of 80 mesh screen may be placed above and below the whole assembly inside the tube in order to prevent the packing from plugging the holes in the grids 18 and 20, which serve as packing supports. A wire lead 22 soldered to the brass cylinder, and another lead 24 clamped to the alpha-emitting strips, may be used as electrical connections to the external circuit. With the construction shown in Fig. 4, these leads may be led down to the glass bead packing thence through the screen 16a and out at 28 and 30 through a suitable stopper 32, which may be made of rubber. The cylinder wall, grids, screens, and supporting arm thus constitute one electrode arm, and the RaD and silver strips the other electrode. Referring to Fig. 1, the first electrode would correspond approximately with $x_2$, and the second electrode with $x_1$ placed at the source, that is, with $x_1$ equal to zero. As the radius of the cylinder is the maximum distance between electrodes and as this distance in practice is about 1.4 cm., it is considerably smaller than the minimum range encountered in the investigation, which was 2.4 cm. for $CO_2$, and the design principles discussed above are fulfilled. The entire apparatus shown in Fig. 4 is sealed with a suitable cement for gas tightness.

Figure 5:
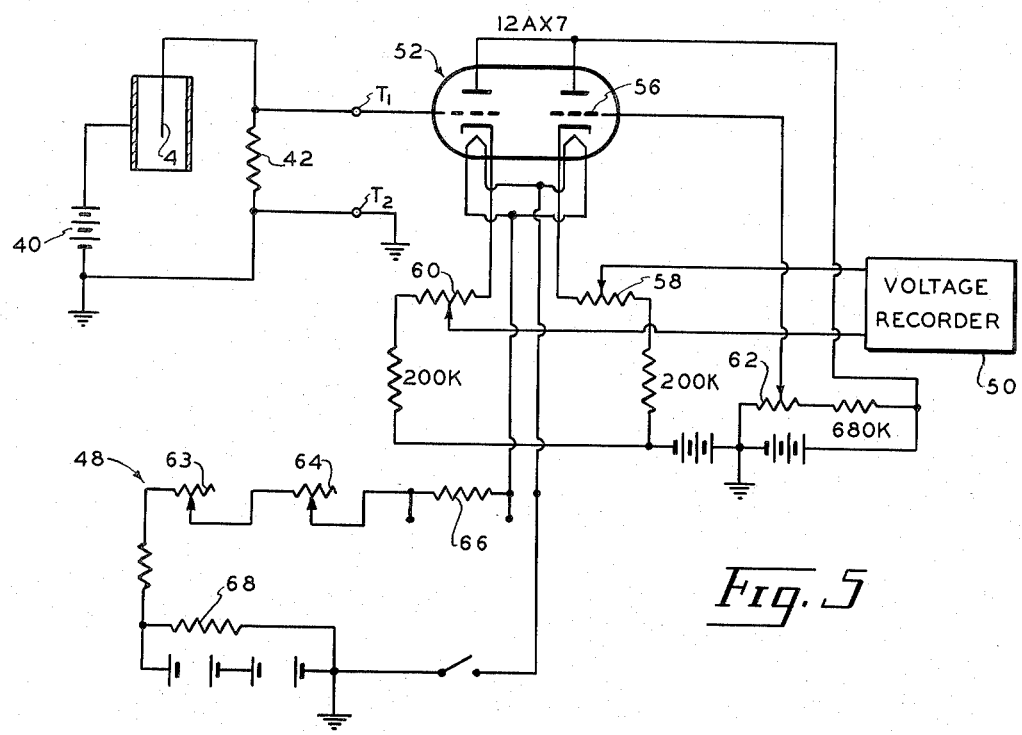
Fig. 5 is a schematic circuit diagram of the cathode follower amplifier circuit used in the gas analyzer of the invention.

Fig. 5 shows the electrical connections employed. The positive terminal of the applied voltage source used, represented by the battery 40 in Fig. 5, is connected to the brass cylinder, causing ionization current to flow from the cylinder through the gas, to the silver strips at 4, through the resistor 42, and back to the voltage source, completing the circuit. The voltage drop thus created between terminals $T_1$ and $T_2$ can thus be measured and recorded as an indication of the desired variable. This voltage drop is made the input to a cathode follower circuit shown at 52. The output from the cathode follower may be recorded directly by any suitable instrument 50 as, for example, a Leeds and Northrop Speed O Max, Model 60,000. This instrument can record voltages in the order of a few millivolts directly, its minimum full scale range being 1.1 millivolt, and its maximum 22.0 millivolts, and has a full scale response time of only two seconds. A cathode follower circuit is used with the Speed O Max instrument because the follower is an impedance transformer, acting between a high impedance cell circuit and a low impedance to the Speed O Max as required by this instrument. Resistance 42 may be two megohms, and the direct attachment of the recorder across its resistance would increase its response time from two seconds to two minutes, which is why the impedance transformer is necessary for the particular purpose in mind. The cathode follower is also a power amplifier, an attribute which makes it a useful circuit if a recording microammeter is to be used.

The cathode follower 52 actually consists of two cathode followers. One has as its input the voltage drop between terminals $T_1$ and $T_2$, and the other has as its input the bias of grid 56, which can be set arbitrarily by means of potentiometer 62. The net output of this total circuit is the voltage difference between the outputs of potentiometers 60 and 58, which is the difference in output of the two separate cathode followers. It is this output which becomes the input to the recorder 50. This makes it possible to shift the zero point in the cathode follower itself while maintaining the zero point of the recorder fixed. Potentiometers 58 and 60 serve as a rough adjustment while potentiometer 62 is used as a fine adjustment. With the above circuit it was found that the output of the cathode follower circuits was very sensitive to the tube heater voltage. This difficulty was corrected by using a tube heater voltage supply circuit 48. Rheostats 63 and 64 served as coarse and fine setting devices, respectively. The steadiness of the supply could be checked by measuring the voltage drop in resistor 66 in series with the tube heater. Resistor 63 prevents polarization of the batteries by always permitting a small current withdrawal.

Except for the above mentioned sensitivity of the cathode followers to the tube heater voltage, these circuits were found to be very stable. For experimental work a regulated power supply which can be varied continuously from zero to 500 volts is very desirable. However, for work under relatively fixed conditions a pile made up of 90 volt B-batteries has been found very satisfactory, being small and inexpensive and having adequate capacity for continued use.

Figure 6:
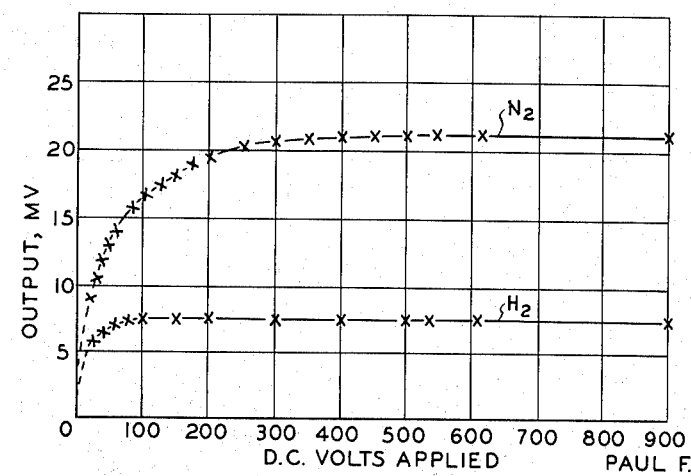
Fig. 6 is a graph showing typical characteristic curves for the gas analyzer with $H_2N_2$.

Fig. 6 shows the characteristic operating curves obtained with the analyzer for a mixture of hydrogen and nitrogen. This curve was obtained by setting the tube heater voltage supply so that the voltage drop in resistor 66 was 10.13 millivolts, and then, with the pure gas in question flowing slowly through the analyzer the output was read for various applied voltages. The threshold for $H_2$ was found to be approximately 70 v., and for $N_2$ approximately 300 v. The remainder of the tests were then made at an applied voltage of 400 v., which satisfies the operating conditions previously described, as this is in voltage region B (Fig. 2).

With a pure gas flowing through the analyzer slight differences in output were noted with changes in flow rate. It was found that these output changes were linear functions of the gauge static pressure immediately above the packed section in which the analyzer was located. As the velocity of the ions is considerable compared to the flow rate of the gases, the possibility was investigated that the apparent effect of flow was actually the effect of the changing pressure drop below the analyzer. This was in fact found to be the case. Gas flow itself has no effect except as it changes the pressure of the gases involved. The effect of pressure is to change the density, so that the effect of temperature would also be to change the output of the cells. Correction should therefore be made for the effect of pressure and temperature when measuring gas concentration. In the actual application of the analyzer to the problem for which it was originally devised, these corrections were found to be negligible. Below a gauge static pressure of 3.0 cm. of water, the error due to static pressure is of the order of the error due to the precision of the analyzer. Actual experience with the analyzer has indicated that the error to be expected would be somewhere in the neighborhood of ±0.2 mol per cent, for a single reading. The response time of the cell was found to be significantly less than about 0.1 or 0.2 second, and theoretical considerations indicate that it is probably less than 0.0035 second. For an analyzer of a given radius, an even lower response time may be obtained by increasing the applied voltage.

Figure 7:
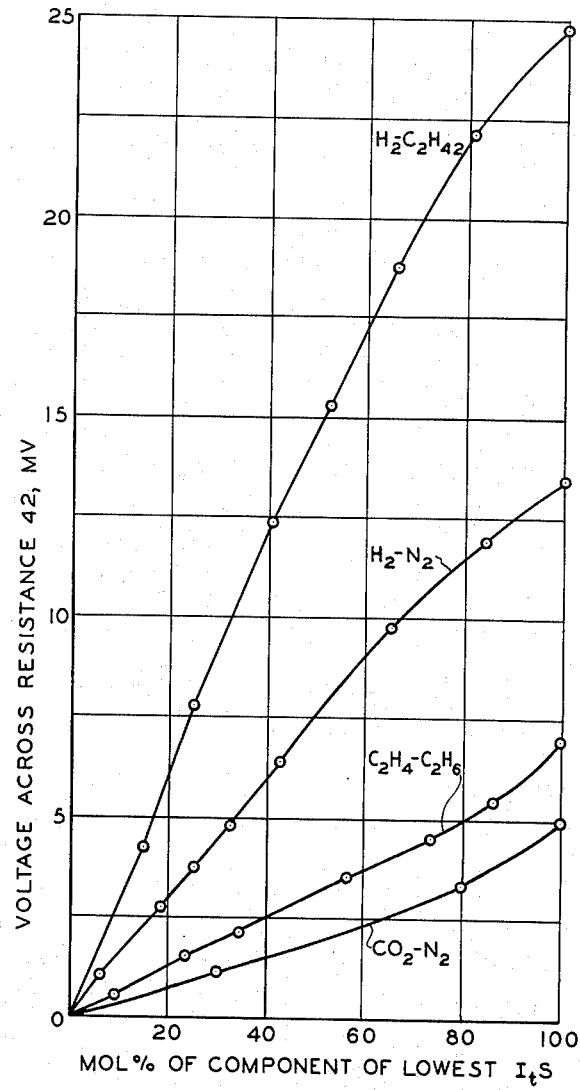
Fig. 7 is a calibration chart for the analyzer with various gases.

Calibration curves for all systems studied are shown in Fig. 7. The ordinate is the output from the cathode follower in millivolts for the gas mixture over and above that for the pure component of lesser $I_tS$ in the mixture (see Table I), corrected for pressure and temperature to 20° C. and 1.0 atm.

TABLE I

*Comparison of total output for various pure gases with the properties of the gases*

| Gas | Total Output, mv. | Relative Stopping Power, S | Total Relative Ionization, $I_t$ | $I_t \times S$ | Mol. Wt. |
| --- | --- | --- | --- | --- | --- |
| $H_2$ | 7.6 | 0.24 | 1.00 | 0.24 | 2 |
| $N_2$ | 21.4 | 0.99 | 0.96 | 0.95 | 29 |
| $CO_2$ | 26.2 | 1.51 | 1.03 | 1.52 | 44 |
| $C_2H_4$ | 32.4 | 1.35 | 1.22 | 1.65 | 28 |
| $C_2H_6$ | 39.6 | 1.51 | 1.30 | 1.97 | 30 |

The above data for S and $I_t$ are from Lind, Samuel C., "The Chemical Effects of Alpha Particles and Electrons," A. C. S. Monograph Series, The Chemical Catalog Co., Inc., New York, N. Y., 1928, p. 36.

To compute ranges, the range in air of an alpha particle from polonium, energy 5.2 mev., is approximately 3.6 cm., at 1.0 atm. and room temperature; the range in $H_2$ would then be $$\frac{3.6}{0.24} = 16 \text{ cm.}$$

for example.

In order to obtain the total output for the system $C_2H_4$–$C_2H_6$ at any particular concentration, the ordinate from Fig. 7 for that system at the desired concentration is added to the ordinate from Fig. 7 for pure $C_2H_4$ from the curve for $H_2$–$C_2H_4$. To this value add the output for pure $H_2$ taken from Fig. 6 at the applied voltage of 400 v. This value, multiplied by 0.507 gives the current in amp.$\times 10^{-9}$ which would flow through the analyzer at 20° C. and 1.0 atmosphere, when the particular mixture of $C_2H_4$–$C_2H_6$ is in the analyzer. The calibration curves are plotted as they are because the final output is in millivolts rather than amperes, and because the subtractions resulting in the ordinate of Fig. 7 are performed electronically by varying the zero point of the cathode follower ouput as described earlier. The figure 0.507 follows from the characteristics of this particular cathode follower circuit and the value of resistor 42 of 2.0 megohms, Fig. 5. The total outputs in millivolts are listed in Table I for the pure components.

It is apparent from Fig. 7 that this analytical cell can be used with the above systems quite satisfactorily. If for any mixture the range of output is not sufficient to permit a desirable precision of measurement, the value of resistor 42, Fig. 5, may be increased, resulting in a directly proportional increase in cathode follower output. There is some limitation to the size of this resistor due to the existence of an inherent positive grid current in most vacuum tubes. This difficulty may be overcome by the use of electrometer tubes of very low positive grid current, or by redesign of the cathode follower. Many different circuits are also available for the measurement of ionization currents, so that application of the technique to any given case is a relatively simple matter.

The analyzer described above is for binary gas mixtures only. It is possible to apply this technique to the analysis of multi-component mixtures as well, however. In Fig. 1, two electrodes are placed at positions $x_1$ and $x_2$. If another similar set is placed closer to the source and shielded by means of a grounded grid from the first set of electrodes, then separate outputs may be obtained from the two pairs of electrodes. The electrodes would, of course, be made of open wire mesh to permit alpha particles to pass through.

The two outputs would have different calibration curves due to the fact that the relative height of the specific ionization curves would be different at the two electrode set positions. Two such sets of measurements would permit analysis of a ternary gas mixture. In general, addition of one more component to a single phase mixture makes necessary one more measurement at another physical condition for the analysis of the mixture, as the degrees of freedom of the system are increased by one for every component added. For the analysis of an $n$-component-mixture, $n-1$ measurements are required for analysis, or $n-1$ pairs of electrodes. Without changing the outward dimensions of the analyzer, several such pairs can be added with little difficulty. The interpretation of the output, however, becomes increasingly complex with each electrode pair added. Alternatively, one or both of the electrodes could be made movable, so that physically only two electrodes would be required to take any desired number of measurements. This would also have the advantage of permitting optimum electrode spacing distances to be used.

As far as the applicability of the analyzer to various gas systems is concerned, almost any two gases of different molecular, atomic, or electronic structure should have different specific ionizations, at least over some portion of the range of the alpha particles in them. One would not expect to be able to distinguish between ortho and para hydrogen, or between hydrogen and deuterium by this method, whereas thermal conductivity methods do make this distinction. It has, in fact, been shown that hydrogen and deuterium are identical in specific ionization throughout the whole range of alpha particle in them.

If information concerning total ionization and stopping power is available, their product, $I_tS$, should be a good index of distinguishability, as it is proportional to the average specific ionization for a particular gas.

Figure 8:
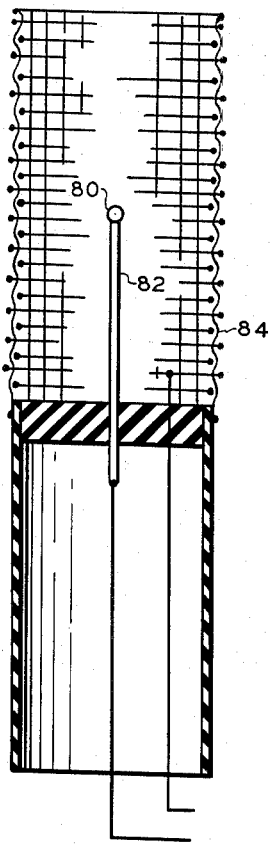
Fig. 8 is a diagram showing a modified form of analyzer cell.

The form of analyzer described above was developed for a specific purpose, namely to fit into a packed tube as shown in Fig. 4, and to interfere as little as possible with the flow through the tube. Many other arrangements are possible. For example, a small cell for the measurement of instantaneous point concentrations could be made using a source 80 on a fine needle 82, surrounded closely by a grid of fine wire 84, the source being one electrode and the grid the other. Such an arrangement is shown in Fig. 8, which is self-explanatory.

It will be noted that for pure gases, or for gases of fixed composition, the analyzer can serve very well as an instantaneous density meter, and, at constant temperature, the analyzer becomes a pressure gauge. Rapid fluctuations in temperature or density of a gas may be measured without the inertial lag encountered in most other systems.

It will be obvious that where higher accuracies are required, greater precision can be readily obtained by employing standard precision laboratory or testing techniques, such as the inclusion of a filter circuit to damp out random noise, the use of guard rings to minimize leakage current, and suitable shielding against electrical disturbances such as those due to closing switches, etc.

It will be apparent that the embodiments shown are only exemplary and that various modifications can be made in construction and arrangement within the scope of our invention as defined in the appended claims.

We claim:

1. The method of gas analysis which comprises the steps of irradiating a gas sample with alpha particles, and measuring a function of the selective ionization of said sample produced by said alpha particles at a definite distance from said source within the minimum range of the alpha particles for any component of the gas mixture.

2. The method of determining the relative percentage of each gas in a gas mixture which comprises irradiating a sample of the mixture with alpha particles from a source of substantially constant intensity, and determining the value of a function of the relative specific ionization of the components of the mixture at a definite distance from said source within the minimum range of the alpha particles for any component of the gas mixture as an indication of the percentage of each component.

3. The invention recited in claim 2 wherein the gas mixture is a binary mixture.

4. The invention recited in claim 2 wherein the relative ionization is measured in an ionization chamber by applying a voltage between the alpha particle source as one electrode and at least one other electrode situated within the range of the particles from said source, and determining a function of the current produced between said electrodes.

5. The invention according to the preceding claim wherein said voltage is in the saturation range.

6. Apparaus for gas analysis which comprises a source of alpha particles of substantially constant intensity, and at least two electrodes located within the range of said alpha particles in a gas to be tested and spaced apart a distance substantially less than the minimum range of the alpha particles for any component of said gas to be tested, means for applying a voltage across said electrodes, and means for measuring a function of the ionizing current produced by said voltage in a gas.

7. The invention according to claim 6 wherein said voltage is in the saturation range for any gas with which the apparatus is to be used.

8. The invention according to claim 6 wherein one of said electrodes is centrally disposed and includes said source of alpha particles, and the other is arcuately disposed about said centrally disposed electrode to define a gas passage therebetween the interelectrode spacing being substantially less than the minimum range of the alpha particles for any component of said gas to be tested.

9. The invention according to claim 8, said source of alpha particles comprising radium D.

References Cited in the file of this patent

UNITED STATES PATENTS

| | | |
|---|---|---|
| 1,808,709 | Blake | June 2, 1931 |
| 2,567,057 | Crumrine | Sept. 4, 1951 |
| 2,590,925 | Borkowski et al. | Apr. 1, 1952 |
| 2,594,777 | Hicks | Apr. 29, 1952 |
| 2,622,208 | Bernstein et al. | Dec. 16, 1952 |
| 2,627,543 | Obermaier | Feb. 3, 1953 |
| 2,641,710 | Pompeo et al. | June 9, 1953 |
| 2,702,898 | Meili | Feb. 22, 1955 |